G. HOLT.
PIPE OR ROD CARRIER.
APPLICATION FILED OCT. 29, 1908.
942,446.
Patented Dec. 7, 1909.
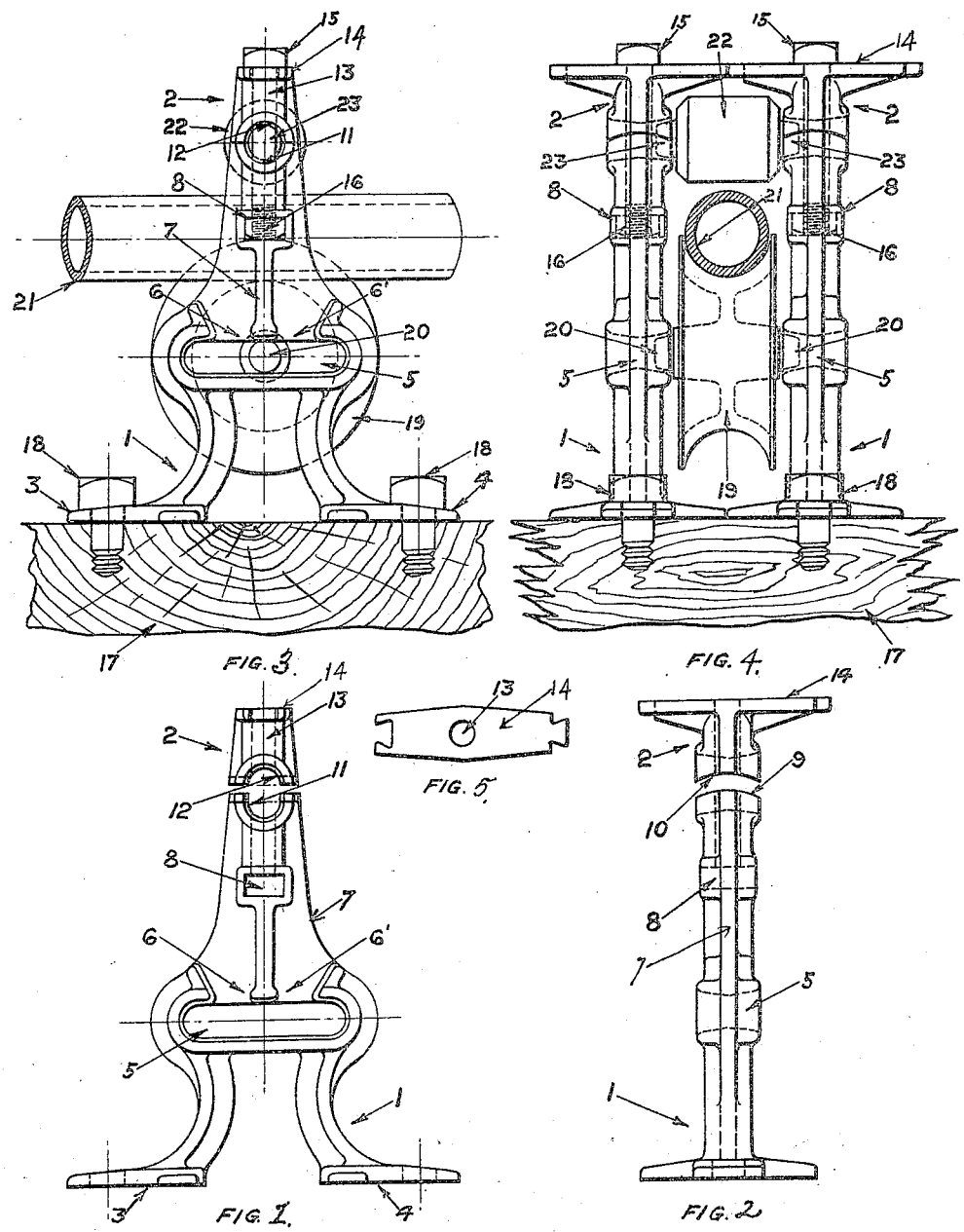

UNITED STATES PATENT OFFICE.

GEORGE HOLT, OF WATERVLIET, NEW YORK.

PIPE OR ROD CARRIER.

942,446.

Specification of Letters Patent.

Patented Dec. 7, 1909.

Application filed October 29, 1908. Serial No. 460,181.

*To all whom it may concern:*

Be it known that I, GEORGE HOLT, a citizen of the United States, and a resident of Watervliet, in the county of Albany, State of New York, have invented new and useful Improvements in Pipe or Rod Carriers, of which the following is a specification.

My invention relates to what are generally known, by those familiar with such devices, as "pipe carriers." These devices are very generally employed by railroads at interlocking plants and are used to support the pipes or rods which connect the interlocking switch and signal levers with the devices to be thrown or moved. These said carriers are located on the ties, or suitable foundations, which are arranged parallel with the rails of the track, and are adapted to support or carry the said pipes or rods. Sometimes several pipe or rod lines are run parallel with the track for operating switches, frogs, locks and signals, which may be located at different distances along the same section of track. These carriers are usually constructed with a large roller or sheave suitably journaled in a stand or support. Upon this sheave rests and moves the pipe or rod. Also above the pipe or rod is located another smaller roller which is adapted to prevent the said pipe or rod from lifting out of place. These sheaves or bottom rollers and the top rollers, as they are called, form a suitable bearing for the pipe or rod to be operated and also a bearing offering very little friction to the movement of the pipe or rod lines. I therefore call it an anti-friction pipe or rod carrier. In the pipe carriers which are in use on the different railroads at the present time, it is necessary, when desiring to remove the pipe or rod line to take out the so-called top roller, which will permit of the pipe being lifted out. In most of the pipe carriers now in use, in order to remove the pipe, it is necessary to remove a couple of cotter pins, a journal pin and a roller, making in all four pieces which must be handled. Moreover, if it is desired to run two or more pipe lines side by side, the carrier stands are not provided with any means of rigidly attaching them together at their tops as they should be. And as the said carrier stands are rough castings and are attached to foundations only at their base, it is obvious that they will not always stand perpendicular to the foundations, which would tend to cramp or throw the rollers out of line and cause considerable friction.

The object therefor of my invention is to provide a pipe or rod carrier which will be as free from friction as possible, to provide means of attaching two or more of the carrier stands together rigidly at the top, and to provide the simplest means of removing the pipe or rod when desired; also to reduce the number of parts to as few as possible.

In carrying out these features in my invention, I refer to the following specification, and accompany it with the attached illustration in which, Figure 1 is a side elevation of one pipe carrier stand, Fig. 2 is a front view of the same stand, Fig. 3 is a side view of two stands, showing top and bottom rollers and pipe in place, Fig. 4 is a front view of the stands, rollers and pipe in place, and Fig. 5 represents the top of this stand showing manner of connecting two or more stands together.

Like figures represent like parts in the several views.

In Figs. 1 and 2, which are a side and front elevation of a single side, 1 is a lower or base section, 2 is a top section. The lower section 1, of Figs. 1 and 2, is made preferably of malleable iron and provided with projecting feet 3 and 4, which are adapted to rest on a suitable foundation, generally of wood, and be secured thereto by lag screws or bolts as desired. The center portion of the lower section of Figs. 1 and 2 has formed therein a slotted opening 5 which is adapted to receive the trunnion 20 of the bottom sheave or roller 19. Recesses 6 and 6' connecting with this slotted opening are formed on either side of a centrally located web 7, the depth of these recesses being such as to permit the removing and replacing of the bottom sheaves or rollers 19, the trunnion 20 of which passes through either of the said recesses 6 and 6' into the slotted opening 5, and is adapted to roll along the said opening 5. Above the slotted opening 5 in the lower section 1 Figs. 1 and 2 is also provided a rectangular opening 8. This opening 8 is of sufficient size to retain the rough nut of a suitable bolt. The upper section 2 of Figs. 1 and 2 is adapted to fit the lower section 1, the lower section being formed convex as shown at 9 and the upper section 2 being formed concave as shown at 10. These surfaces are adapted to fit snugly together but may be of any other suitable form than that shown. Semicircular grooves 11 and 12 are formed respectively in the lower section 1 and the upper section 2, and when the two sections are clamped together these openings 11 and 12 form a suitable bearing for the trunnions 23 and 24 of the top roller 22 which will be shown later. A suitable hole 13 is formed in both the upper section 2 and the lower section 1 passing downward through said section from the top of the upper section 2 into the rectangular opening 8 of section 1. This hole 13 is adapted to receive a bolt which secures the two parts together, the threaded end of the bolt entering a nut 16 Fig. 3 located in the rectangular opening 8. When this bolt is tightened up the two parts 1 and 2 will be rigidly held together. The top portion of the upper section 2 is formed with a flaring T-head 14. When two of these sides are secured to their foundations forming a complete carrier as shown in Fig. 4, the edges of the T-head 14 are adapted to interlock with each other, affording rigidity to the construction and preventing the two carrier sides from spreading. This interlocking is accomplished by dove-tailing the two adjoining T-heads together as shown. Plan of one of these said heads is shown in Fig. 5.

In Figs. 3 and 4 is shown a complete assembled pipe carrier as employed in actual service. The sides 1 and 1 and 2 and 2 are bolted together by means of bolt 15 which passes through the holes 13 in portion 2 as before stated into the nuts 16 which are located in the openings 8. These two sides are secured to suitable foundations 17 preferably of wood by means of lag screws 18.

The bottom roller 19, which is made in the form of a sheave, has formed thereon suitable trunnions 20 which are adapted to rest in grooved openings 5 as shown in Figs. 3 and 4. The pipe or rod 21 is adapted to rest in the groove of sheave 19 and when moved longitudinally will revolve sheave 19 and cause it to run on its trunnions 20 within the slot 5. Above the pipe 21 is located the top roller 22 which has formed thereon trunnions 23, similar to those of the bottom roller 19. Roller 22 is adapted to rotate in the openings formed by 11 and 12. The function of this roller 22 is to prevent the buckling or upward bending of pipe or rod 21, which might otherwise occur when the pipe is under pushing stress.

If for any reason it is desired to remove the pipe or rod 21, the bottom roller 19 or the top roller 22, it will only be necessary to slack off one of the bolts 15 by unscrewing it from the nut 16 sufficiently to allow the upper section 2 to be raised high enough to disengage itself from the adjacent T-head. After this, section 2 may then be slipped out of place and the desired removals or replacements of the pipe or roller made without disturbing any of the other parts.

It is obvious from the foregoing description that no scheme could be simpler than the removal or displacement of one piece to make the necessary changes or repairs. Moreover, the cost of manufacture is reduced to a minimum as there are no fitted or finished parts, everything being rough cast. The design of the side is also such that ample material is provided for the most severe strain to which such apparatus is ever liable to be subjected. If it is desired to operate more than one of the rods 21, additional sides may be secured to the foundations on either side of the complete pipe carrier as shown in Fig. 4, the lower flanged feet and the upper flanged head abutting and interlocking in a similar manner. Similar top rollers, bottom rollers and pipe to those shown in Fig. 4 may also be placed between the adjacent sides.

Having thus described my invention, what I claim as new and desire to secure by Letters Patent is as follows:

1. In a pipe or rod carrier the combination of a lower or base section adapted to be secured to a suitable foundation, an upper section adapted to engage with the top of the lower section, means associated with the two sections to prevent their changing their alinement with each other after being secured together, and a bolt or screw for securing the upper and lower sections together, said bolt passing through the upper section into the lower section.

2. In a pipe or rod carrier, the combination of lower or base sections adapted to be secured to a suitable foundation, upper sections adapted to engage with the tops of the lower sections in a manner preventing the upper and lower sections changing their relative positions with each other, means for rigidly connecting together the tops of adjacent upper sections and a bolt or screw for securing each upper section to its lower section.

3. In a pipe or rod carrier, the combination of lower or base sections, upper sections engaging with the tops of the lower sections in a manner maintaining alinement, means associated with the sections for supporting top and bottom rollers as shown, means associated with the upper sections for rigidly connecting them together and a bolt or screw for connecting each upper section to its lower section.

4. In a pipe or rod carrier, the combination of lower or base sections and upper sections matching or fitting together, the upper sections being secured to the lower sections, each by a bolt or screw, a bottom roller and a top roller journaled in the said sections, the top roller adapted to be displaced and replaced after removing or loosening one of the said bolts or screws as shown and described.

5. In a pipe or rod carrier, the combination of lower sections adapted to be secured to a foundation, upper sections secured to the lower sections by bolts passing through the upper sections into the lower sections, the heads of the upper sections adapted to interlock with one another, a top and bottom roller journaled in the said sections, the top roller adapted to be removed upon the removal of one of the said bolts as shown and described.

6. In a pipe or rod carrier, the combination of two sides each composed of an upper section and a lower section, secured together by suitable means, the lower section formed with suitable feet for securing said section to a foundation, the upper section provided with a flaring or T-head, the feet of the lower sections abutting one another and the heads of the upper sections adapted to interlock with one another when the said sides are properly secured to the foundation.

Dated October 14th, 1908.

GEORGE HOLT.

Witnesses:
H. B. TAYLOR,
CHAS. MCGREGOR.